United States Patent [19]

Aull et al.

[11] Patent Number: 4,476,350

[45] Date of Patent: Oct. 9, 1984

[54] BATTERY FEED CIRCUIT

[75] Inventors: Denis W. Aull, Indianapolis, Ind.; Dewayne A. Spires, Plaistow, N.H.

[73] Assignee: Bell Telephone Laboratories, Incorporated, Murray Hill, N.J.

[21] Appl. No.: 346,585

[22] Filed: Feb. 8, 1982

Related U.S. Application Data

[63] Continuation of Ser. No. 234,684, Feb. 17, 1981.

[51] Int. Cl.$^3$ .............................................. H04M 19/08
[52] U.S. Cl. .............................. 179/70; 179/170 NC; 179/77
[58] Field of Search .............. 179/70, 81 R, 77, 81 A, 179/18 F, 18 FA, 16 A, 16 AA, 170 NC, 170 D

[56] References Cited

U.S. PATENT DOCUMENTS

| | | | |
|---|---|---|---|
| 4,004,109 | 1/1977 | Boxall | 179/170 NC |
| 4,037,065 | 7/1977 | Nahay | 179/170 NC |
| 4,053,722 | 10/1977 | Nahay | 179/170 NC |
| 4,113,996 | 9/1978 | Sanderson | 179/170 NC |
| 4,203,012 | 5/1980 | Boxall | 179/170 NC |
| 4,272,656 | 6/1981 | Nishikawa | 179/170 NC |
| 4,283,604 | 8/1981 | Chambers, Jr. | 179/70 |
| 4,300,023 | 11/1981 | Kelley et al. | 179/170 NC |

OTHER PUBLICATIONS

"A Floating Low-Power Subscriber Line Interface", pp. 180-181, IEEE International Solid-State Circuits Conf., 1980.

Primary Examiner—Gerald L. Brigance
Attorney, Agent, or Firm—David R. Padnes

[57] ABSTRACT

The battery feed circuit (FIG. 3) provides a balanced dc feed current ($I_{TR}$) to a 2-wire telecommunications path. The dc current in each conductor is generated by a bidirectional current source (103 or 104) which is responsive to one of a complementary pair of first control signals ($S_1$, $\overline{S}_1$) along with a second control signal ($S_2$). The complementary pair of first control signals is generated by a feedback circuit (105) which monitors the differential mode voltage ($V_{TR}$) across the path. To reduce power consumption, the complementary pair of first control signals is a nonlinear function of the differential mode voltage. The resulting battery feed profile (FIG. 2) reduces the current on short path lengths. Longitudinal balance is provided by the second control signal which varies the currents generated by each bidirectional current source by equal amounts. This second control signal is generated by a second feedback circuit (109) which monitors the common mode voltage across the path. The above described circuit can also provide a number of features, such as feed current reversal and shutdown required in many telecommunications applications.

14 Claims, 5 Drawing Figures

DC LOAD-LINE

4,476,350

BATTERY FEED CIRCUIT

This application is a continuation of application Ser. No. 234,684, filed Feb. 17, 1981.

TECHNICAL FIELD

The present invention relates to a battery feed circuit for telecommunications applications.

BACKGROUND OF THE INVENTION

A battery feed circuit supplies a dc feed current to telecommunications equipment through a 2-wire transmission path that also typically conducts a bidirectional voice or data signal. This feed current is balanced, i.e., each transmission wire conducts a current that is equal in magnitude but opposite in direction to the other.

In telecommunications applications, the length of the 2-wire transmission path varies considerably. As a result, the battery feed circuit must be designed to supply the requisite dc feed current over a range of path resistances. Transmission paths are also susceptible to induced longitudinal or common mode signals, e.g., a 60 Hz power signal, which can be transformed into noise. It is, therefore, necessary that the battery feed circuit minimize the transformation of such longitudinal signals into noise.

A variety of battery feed circuits have been developed. In general, these circuits can be grouped into one of two classes depending on their battery feed profile, i.e., relationship of dc feed current versus voltage across the 2-wire transmission path, and the manner in which they deal with longitudinal signals. The first class of battery feed circuits (see, for example, U.S. Pat. No. 4,004,109 to F. S. Boxall, issued Jan. 18, 1977) produces a linear battery feed profile and has a low common mode impedance to longitudinal signals. The noise induced in the 2-wire transmission by the longitudinal signals is minimized by this first class of circuits with only a moderate degree of success. Moreover, while such circuits perform satisfactorily in many applications, the use of a linear battery feed profile dissipates excessive power on short 2-wire transmission paths. The second class of battery feed circuits, such as disclosed in a publication entitled "A Floating Low-Power Subscriber Line Interface" by L. Freimanis and D. P. Smith, *ISSCC Digest*, 1980, page 180, 181, provides a non-linear battery feed profile which limits feed current on short 2-wire transmission paths. The noise induced by longitudinal signals is minimized by providing a high common mode impedance through the use of isolation devices, such as transformers or opto-isolators. These devices, however, are expensive and bulky. Therefore, existing battery feed circuits having a non-linear feed profile are not amenable to size reduction using integrated circuit technology.

In view of the foregoing, development of a low cost integrable battery feed circuit having a non-linear feed profile and reduced susceptibility to longitudinally induced noise would be beneficial.

SUMMARY OF THE INVENTION

Pursuant to the present invention, a balanced dc battery feed current is generated in a 2-wire telecommunications path. The dc current in each conductor of the 2-wire path is generated by a bidirectional current source. Each current source is regulated by one of a complementary pair of first control signals along with a second control signal. A non-linear battery feed profile is generated by the current sources in response to the complementary pair of first control signals. This pair of control signals is produced by a feedback circuit which monitors the differential mode voltage across the path. A low common mode impedance to longitudinals is provided by a second feedback circuit which monitors the common mode voltage across the 2-wire path and generates the second control signal therefrom. This second control signal drives each bidirectional current source by an equal amount to maintain a constant difference between the dc current in each conductor. Accordingly, longitudinally induced noise is minimized.

DETAILED DESCRIPTION

Figure 1:
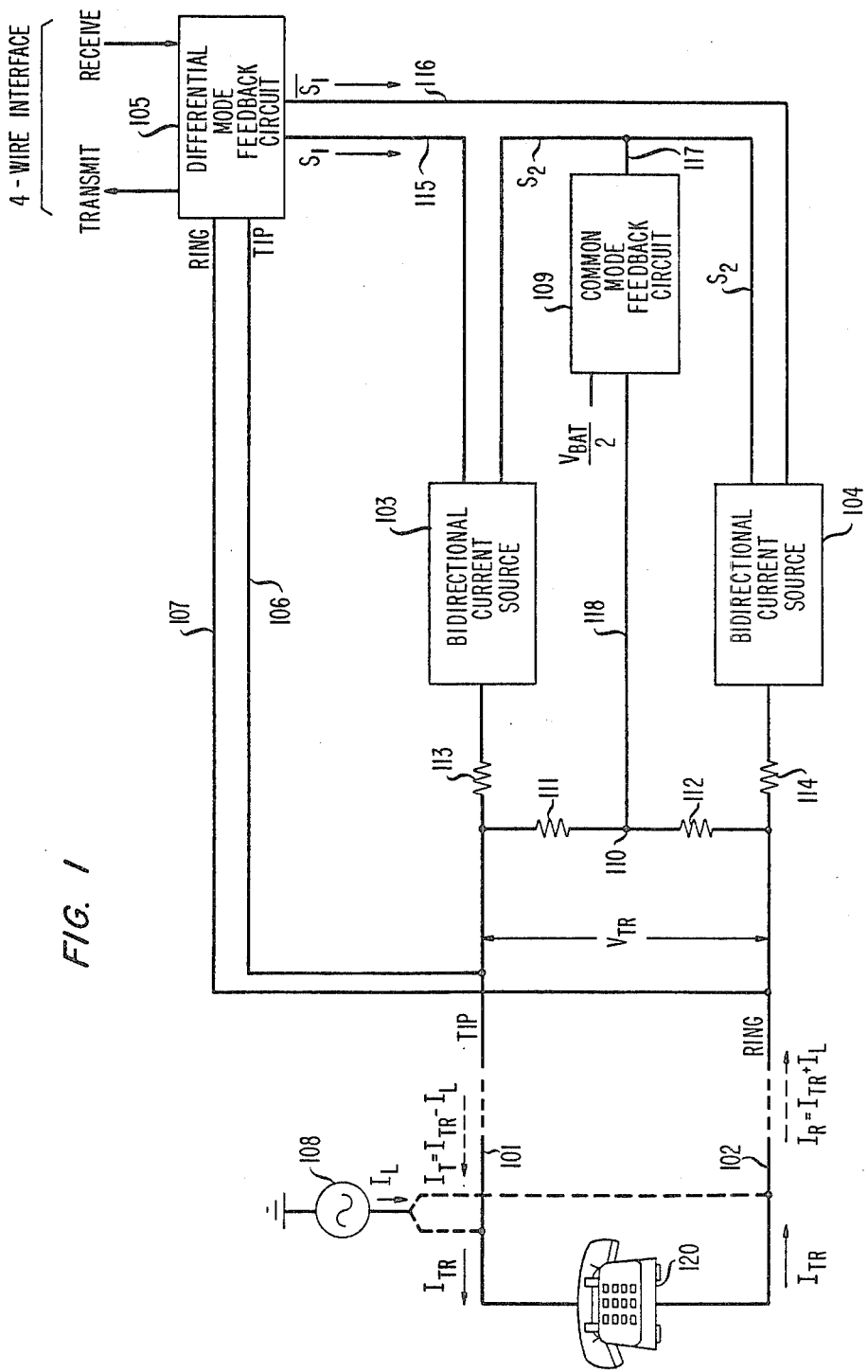
FIG. 1 is a schematic block diagram of a battery feed circuit in accordance with the present invention.

FIG. 1 shows an illustrative telecommunications application of the present invention. A 2-wire telecommunications path, comprising metallic conductors 101 and 102, couples bidirectional voice or data signals between a subscriber station 120 and a conventional 4-wire interface in a telephone exchange. Such a 2-wire telecommunications path is commonly referred to as a subscriber loop with conductors 101 and 102 respectively designated as the tip and ring leads. The length and, therefore, the resistance of the tip and ring leads from the telephone exchange to the subscriber station set can vary considerably from subscriber to subscriber. It will, of course, be understood that the 2-wire telecommunications path can connect to a 2-wire switch instead of a subscriber station set. In such cases, the 2-wire telecommunications path is referred to as a trunk.

A dc feed current to the station set 120 is generated by bidirectional current source 103 connected to the tip lead through protection resistor 113 and by bidirectional current source 104 connected to the ring lead through protection resistor 114. These protection resistors are required for the prevention of lightning surge damage to the battery feed circuit. A typical value for each protection resistor is 100 ohms. Each current source is supplied with a negative dc potential, $V_{BAT}$, and ground. By convention, the dc feed current flows from the tip to the ring leads. This direction of feed current flow is also referred to as normal battery (NB). In addition, the feed current, $I_{TR}$, is balanced, i.e., the current in tip and ring have the same magnitude but flow in opposite directions.

The magnitude of the feed current is regulated by differential mode feedback circuit 105 which is connected to the tip and ring leads via conductors 106 and 107. Feedback circuit 105 monitors the differential mode voltage, $V_{TR}$, between the tip and ring leads and generates control signals $S_1$ and $\bar{S}_1$ which are coupled via leads 115 and 116 to sources 103 and 104. Control signals $S_1$ and $\bar{S}_1$ are complementary signals, i.e., equal in magnitude but opposite in polarity, and are a non-linear function of $V_{TR}$. This relationship advantageously reduces the power consumption by providing a non-linear battery feed profile which limits the feed current on short tip and ring lead lengths.

Figure 2:
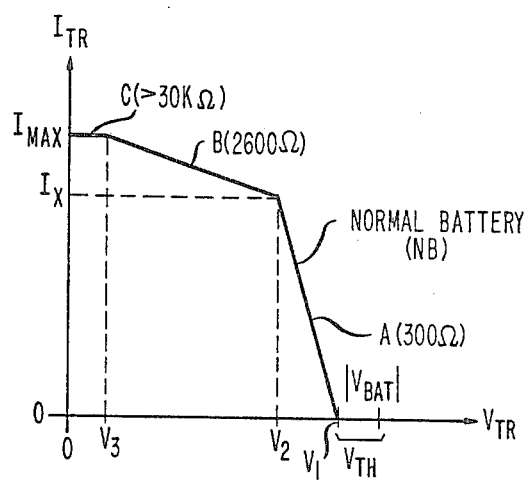
FIG. 2 is a graph of the non-linear battery feed profile provided by the present invention.

FIG. 2 shows the non-linear normal battery feed profile provided by control signals $S_1$ and $\bar{S}_1$. Nominally, the magnitude of $V_{TR}$ falls between $V_1$ and $V_2$ and the feed current follows line segment A. For smaller values of $V_{TR}$ between $V_3$ and $V_2$, the normal battery feed current is governed by segment B and varies between $I_X$ and $I_{MAX}$. Line segment C illustrates that the magnitude of the feed current is limited to $I_{MAX}$ regardless of any decrease in $V_{TR}$ below $V_3$. In models constructed, $I_{MAX}$ was 42 milliamps and $I_X$ was 32 milliamps. The slopes of line segments A, B and C were 300 ohms, 2600 ohms and >30,000 ohms, respectively.

It is well known that longitudinal currents can be induced for various sources onto the tip and ring leads. FIG. 1 shows a typical 60 Hz longitudinal source designated as 108. Common mode source 108 induces a longitudinal current, $I_L$, which flows in the same direction in both the tip and ring leads. The total current in tip, $I_T$, is equal to the difference between $I_{TR}$ and $I_L$. The total current in ring, $I_R$, is equal to the sum of $I_{TR}$ and $I_L$. Since the magnitude of $I_L$ can exceed the magnitude of $I_{TR}$, it is possible to create a reversal of the total current in either the tip or ring leads. Because current sources 103 and 104 are bidirectional and linear as the current reverses, i.e., linear through the origin, this current reversal does not create noise. Any differential mode voltage created by the longitudinal current $I_L$ is undesirable noise. The measure of how well a circuit minimizes such noise is commonly referred to as the longitudinal balance of the circuit. Longitudinally induced noise can be minimized by creating equal and low common mode impedance in the tip and ring leads.

In the present invention, a low common mode impedance in tip and ring is provided by a common mode feedback path to current sources 103 and 104. As will be discussed, equal common mode impedances in tip and ring are achieved by matching the transconductance of current source 103 and current source 104.

The common mode feedback path comprises equally valued resistors 111 and 112, conductors 117 and 118 and common mode feedback circuit 109. Circuit 109, referenced to ($V_{BAT}/2$), monitors any change in the common mode or average voltage at node 110 caused by the presence of longitudinal signals and generates a control signal $S_2$. Control signal $S_2$, connected via lead 117 to current sources 103 and 104, drives each current source to source or sink whatever current a longitudinal source drives into the tip and ring leads. This technique is called longitudinal cancellation. Accordingly, a constant difference between the feed current in tip and ring is maintained.

Figure 3:
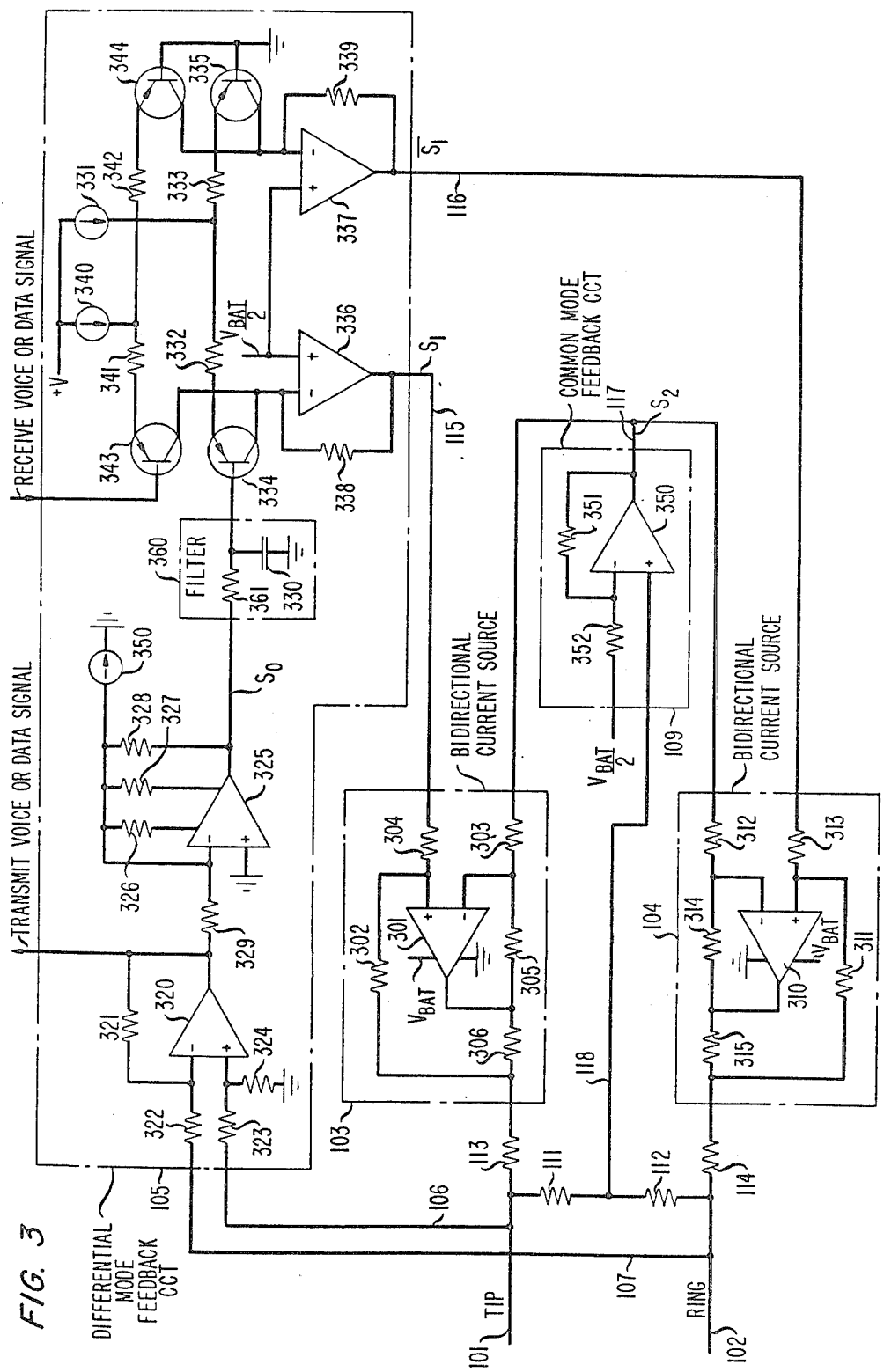
FIG. 3 is a detailed schematic diagram of FIG. 1.

Refer now to FIG. 3. Current source 103 comprises differential operational amplifier 301 and resistors 302, 303, 304, 305 and 306. The values of input resistors 303 and 304 are equal and the values of feedback resistors 302 and 305 are equal. Control signals $S_1$ and $S_2$ are respectively coupled to the positive and negative inputs of differential amplifier 301. The use of differential amplifier 301 advantageously provides a bidirectional current output to protection resistor 113. The magnitude of this current output is equal to the difference between control signals $S_1$ and $S_2$ times the transconductance of current source. This transconductance is equal to the value of $$\frac{\text{resistor 302}}{(\text{resistor 304})(\text{resistor 306})}.$$

Current source 104 comprises differential operational amplifier 310 and resistors 311, 312, 313, 314 and 315. Each resistor in current source 104 has the same value as its counterpart in current source 103. Control signals $\bar{S}_1$ and $S_2$ are coupled to the positive and negative inputs of differential operational amplifier 310, respectively. Since the structure of current source 104 is identical to that of current source 103, the current output of current source 104 is also bidirectional and the transconductance of current source 103 and 104 are equal. The current output of source 104 has a magnitude equal to ($\bar{S}_1 - S_2$) times the value of $$\frac{\text{resistor 311}}{(\text{resistor 313})(\text{resistor 315})}.$$

In the absence of longitudinals, the application of $S_1$ to current source 103 generates a preselected current to flow into the tip lead. Simultaneously, the application of control signals $\bar{S}_1$ to current source 104 causes an equal current to flow from the ring lead through the output of differential amplifier 310 into $V_{BAT}$.

Control signals $S_1$ and $\bar{S}_1$ are generated by differential mode feedback circuit 105. Differential operational amplifier 320, within circuit 105, has its positive input connected to tip via lead 106 and its negative input connected to ring via lead 107. The value of input resistors 322 and 323 are equal. The values of resistors 321 and 324 are also equal. Differential amplifier 320 provides an output voltage equal to the differential mode voltage across tip and ring, $V_{TR}$, times the value of resistor 321/resistor 322. The voltage output of differential amplifier 320 represents both of the dc voltage generated by the current outputs of current sources 103 and 104 along with any ac voltage representing data or voice signals on the tip and ring leads. This output voltage is coupled to the transmit side of a 4-wire interface, where the dc voltage is blocked thereby allowing only transmission of the ac component. The output of differential amplifier 320 is also coupled through resistor 329 to the negative input of differential amplifier 325.

Differential amplifier 325 provides any one of three different gains depending on the value of the voltage output of differential amplifier 320. This variation in gain alters the gain of circuit 105 as a function of $V_{TR}$ and, therefore, the magnitude of control signals $S_1$ and $\bar{S}_1$ to provide the non-linear battery feed profile shown in FIG. 2.

The magnitude of the slopes of line segments A, B and C in ohms is equal to the reciprocal of the product of the transconductance of current source 103 and 104 times one-half the gain of circuit 105. Line segment A is provided when the gain of differential amplifier 325 is equal to the value of $$\frac{\text{resistor 328}}{\text{resistor 329}}.$$

The feed profile follows line segment B when the gain of amplifier 325 is equal to the value of $$\cfrac{1}{\left(\cfrac{1}{\text{resistor 328}} + \cfrac{1}{\text{resistor 327}}\right) \text{resistor 329}}$$

Finally, an amplifier 325 gain equal to the value of $$\cfrac{1}{\left(\cfrac{1}{\text{resistor 328}} + \cfrac{1}{\text{resistor 327}} + \cfrac{1}{\text{resistor 326}}\right) \text{resistor 329}}$$

provides the substantially horizontal line segment C.

The negative input of differential amplifier 325 is also coupled to current source 350 which determines the $V_{TR}$ intercept, $V_1$, in FIG. 2. Current source 350 is judiciously selected to provide an intercept whose value is some threshold voltage, $V_{TH}$, less than the battery voltage $V_{BAT}$. This assures that amplifiers 301 and 310 remain properly biased, i.e., do not reach saturation, when an open circuit appears across tip and ring and there is no feed current generated. As a result, longitudinal cancellation along with voice and data transmission is maintained regardless of the presence or absence of a feed current.

Filter 360 comprising resistor 361 and capacitor 330, removes any ac voice or data voltage component from the voltage output ($S_0$) of differential amplifier 325. A filter time constant of 200 milliseconds performed satisfactorily.

It will be noted that the voltage output ($S_0$) of differential amplifier 325 is referenced to ground and control signals $S_1$ and $\overline{S}_1$ are referenced to ($V_{BAT}/2$). A shift of the voltage reference point to ($V_{BAT}/2$) is provided by current source 331, resistors 332, 333, 338, 339, emitter coupled transistors 334, 335 and differential amplifiers 336 and 337. The level of $I_{MAX}$ shown in FIG. 2 is directly proportional to the current provided by current source 331. Therefore, $I_{MAX}$ can be adjusted by varying the current provided by current source 331.

Transistors 343, 344, current source 340 and resistors 341 and 342 couple any ac data or voice voltages representing incoming or receive signals to differential amplifiers 336 and 337. Accordingly, these ac signals are also coupled through leads 115 and 116 to current sources 103 and 104 and thence to the tip and ring leads.

Common mode feedback circuit 109 comprises difference amplifier 350 and resistors 351 and 352. The positive input of difference amplifier 350 monitors the common mode voltage at node 110 while the negative input of difference amplifier 350 is referenced to ($V_{BAT}/2$). The common mode impedance in tip, in ohms, is equal to:

$$\cfrac{1}{\left(1 + \cfrac{\text{resistor 351}}{\text{resistor 352}}\right) G_{103}},$$

where $G_{103}$ is the transconductance of current source 103. The common mode impedance of the ring lead is equal to $$\cfrac{1}{\left(1 + \cfrac{\text{resistor 351}}{\text{resistor 352}}\right) G_{104}},$$

where $G_{104}$ is the transconductance of current source 104. The value of the common mode impedance in tip and ring is advantageously selected to be the sum of resistor 113 and resistor 306 and the sum of resistor 114 and resistor 315, respectively. This selection provides a constant output voltage of differential amplifier 301 and 310 regardless of the magnitude of any longitudinal currents. Hence, the permissible voltage swing at the output of both differential amplifier 301 and 310 are not reduced by the magnitude of the longitudinal currents. Longitudinal cancellation is only limited by the permissible voltage swing at the output of differential amplifier 350 and the output current capability of differential amplifier 301 and 310. As a result, longitudinal cancellation can be provided for induced currents having a magnitude considerably greater than the feed current.

A low common mode impedance is provided by selecting the ratio of resistor 351 to 352. Longitudinal balance is achieved by matching the transconductance of current sources 103 and 104. As these current sources can be advantageously realized using integrated circuitry, such matching can be readily provided by trimming the value of corresponding resistors to one another. In this regard, it should be noted that protection resistors 113 and 114 do not affect the common mode impedance of either tip or ring. Consequently, the matching of resistors 113 and 114 is not required for longitudinal balance. This feature is particularly advantageous since the matching of protection resistors, which must withstand lightning surges, is considerably more expensive than the matching of resistors within current sources 103 and 104.

Figure 4:
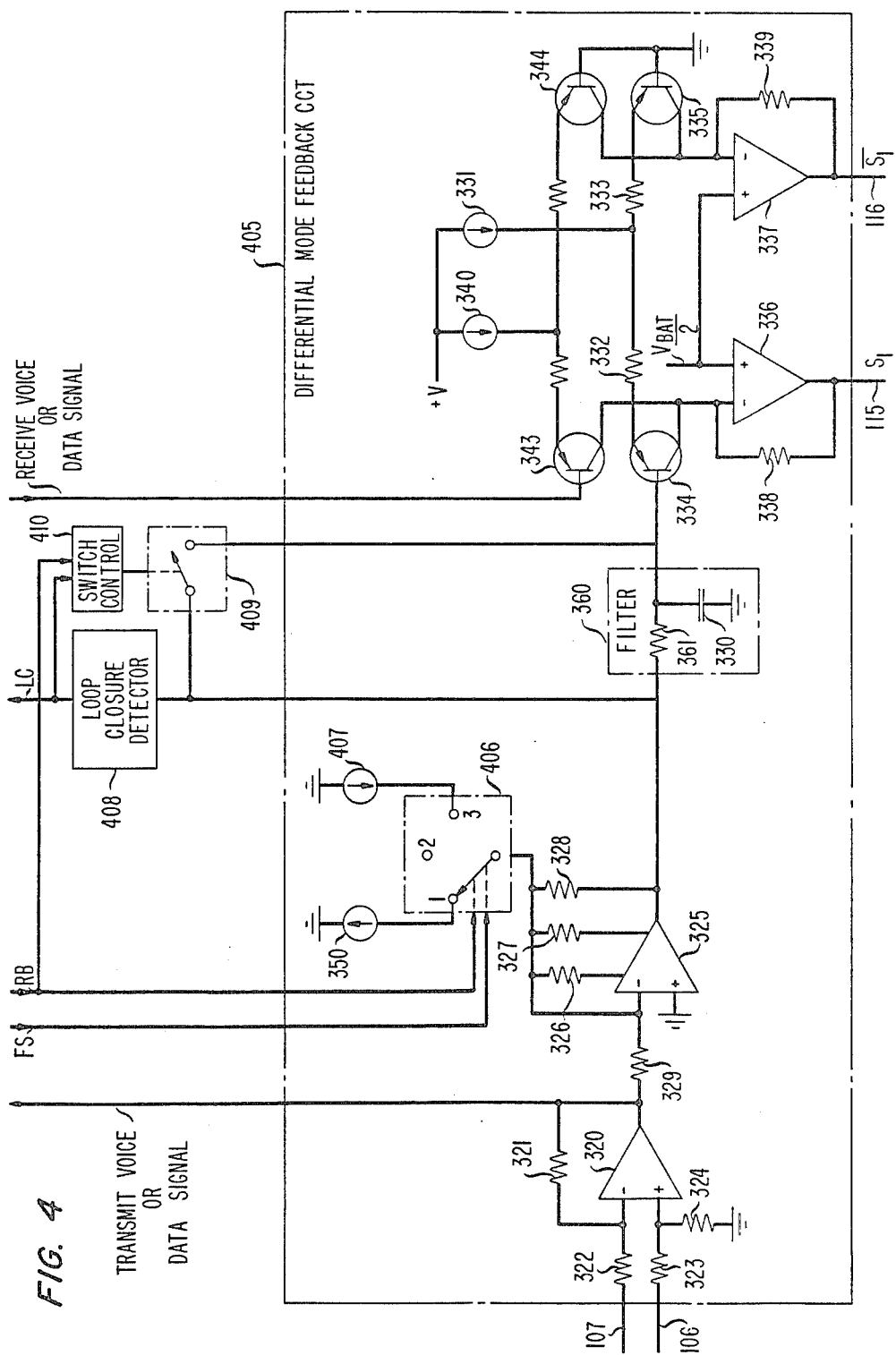
FIG. 4 is a modification of the non-linear feedback circuit 105 shown in FIG. 2 coupled to additional circuitry to provide several features required in many telecommunications applications.

Referring to FIG. 4, the above described battery feed circuit can be conveniently adapted to provide several features required in telecommunications applications. Differential mode circuit 405 is identical to circuit 105 except for the addition of switch 406 and current source 407. Switch 406, illustratively shown as a mechanical switch, is controlled by either the feed current shutdown (FS) control signal or the reverse battery (RB) control signal. Both these signals are two level logic signals derived in signaling equipment connected to the 4-wire interface. A predetermined state (e.g., logic "0") of both the RB and FS control signal toggles switch 406 to terminal 1 to couple current source 350 to the negative input of differential amplifier 325. This, as discussed, provides the normal battery profile shown in FIG. 2. A logic "1" RB control signal, toggles switch 406 to terminal 3 to couple current source 407 to the negative input of differential amplifier 325. Current source 407 is identical to current source 350 except for a reversal of polarity.

Figure 5:
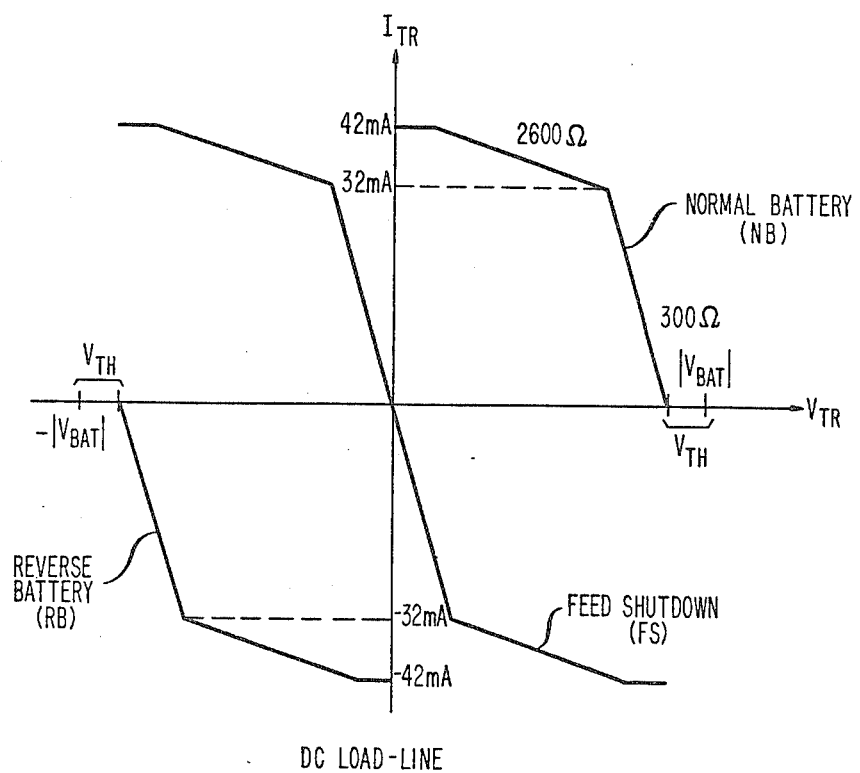
FIG. 5 is a graph of the non-linear battery feed profiles attainable with the circuitry of FIG. 4.

The connection of current source 407 reverses the polarity of control signals $S_1$ and $\overline{S}_1$. As a result, the normal battery tip to ring flow is reversed. The reverse battery feed profile (RB), shown in FIG. 3, is equal and opposite to the NB profile normally provided. A reverse battery profile is required for signaling when the 2-wire conductors 101 and 102 are trunk leads connected to a 2-wire switch or private branch exchange (PBX) instead of subscriber station 120. In other trunk applications, feed current is not required. In such cases, a logic "1" FS control signal causes switch 406 to couple to terminal 2 and apply an open circuit to the negative input of differential amplifier 425. The resulting feed shutdown profile is shown in FIG. 5. During feed shutdown, longitudinal balance is maintained since the operation of common mode feedback circuit 109 is unaffected.

Loop closure signal (LC) is another two level logic signal required by other telecommunications equipments connected to the 4-wire interface. A change in state of logic signal LC is generated by a predetermined change in the magnitude of $V_{TR}$. This predetermined change, typically 3 volts, is indicative of dial pulsing and/or an off-hook condition of subscriber station 120. A particular state, for example logic "1", of logic signal LC can be conveniently generated by the addition of loop closure detector 408. Detector 408 comprises a comparator which generates a logic "1" LC signal when the output of differential amplifier 325 exceeds a fixed threshold.

Switch 409 and switch control 410 can also be advantageously provided along with reverse battery and loop closure signal generation. Switch 409, disposed in parallel with filter 360, is closed momentarily (nominally 16 milliseconds) upon the detection of a change in state of either the LC or RB signal by switch control 410. The momentary closure of switch 409 bypasses filter 360 to avoid distortion and delay during dial pulsing or transitions between normal and reverse battery feed.

What is claimed is:

1. A battery feed circuit for a two-wire communication path characterized in that the battery feed circuit comprises:
    means (103, 104, 336, 337) responsive to a control signal ($S_0$) for respectively generating first and second dc currents in first and second conductors of said path, said first and second currents being equal in magnitude and opposite in direction, said current generating means also varying said first and second currents by an equal amount in response to a second control signal to maintain a constant difference therebetween,
    a first feedback means (320-329, 350) responsive to the differential mode voltage ($V_{TR}$) across the path for generating said control signal ($S_0$), and
    a second feedback means (109) for generating said second control signal by monitoring the common mode voltage across the path.

2. A battery feed circuit in accordance with claim 1 characterized in that
    said current generating means comprises circuitry (336) for generating a first control signal ($S_1$) and means (103) for generating said first current ($I_{TR}$) in response to said first control signal, and
    circuitry (337) for generating a complement of said first control signal ($\overline{S}_1$) and means (104) for generating said second dc current in response to said complement of said first control signal.

3. The battery feed circuit of claim 2 wherein said first feedback means biases ($V_{TH}$) said current generating means to prevent saturation when an open circuit exists between said first and second conductors.

4. The battery feed circuit of claim 2 wherein said first feedback means includes means (406,407) responsive to a predetermined state of an applied control signal (RB) for reversing the direction of said first and second currents.

5. The battery feed circuit of claim 3 wherein said first feedback means includes means (406,407) responsive to a predetermined state of an applied control signal (RB) for reversing the direction of said first and second currents.

6. The battery feed circuit of claim 4 wherein said first feedback means includes means (406,terminal 2) responsive to a predetermined state of a second applied control signal (FS) for inhibiting the generation of said first and second currents.

7. The battery feed circuit of claim 5 wherein said first feedback means includes means (406,terminal 2) responsive to a predetermined state of a second applied control signal (FS) for inhibiting the generation of said first and second currents.

8. The battery feed circuit of claim 2 wherein said first feedback means includes means (408) for detecting a predetermined change in the differential mode voltage across said path.

9. The battery feed circuit of claim 3 wherein said first feedback means includes means (408) for detecting a predetermined change in the differential mode voltage across said path.

10. The battery feed circuit of claim 4 wherein said first feedback means includes means (408) for detecting a predetermined change in the differential mode voltage across said path.

11. The battery feed circuit of claim 5 wherein said first feedback means includes means (408) for detecting a predetermined change in the differential mode voltage across said path.

12. The battery feed circuit of claim 6 wherein said first feedback means includes means (408) for detecting a predetermined change in the differential mode voltage across said path.

13. The battery feed circuit of claim 7 wherein said first feedback means includes means (408) for detecting a predetermined change in the differential mode voltage across said path.

14. The battery feed circuit of claims 10, 11, 12, or 13 wherein said first feedback means includes means (409,410) responsive to the detection of said predetermined change in said differential mode voltage or a change in state of said applied control signal for bypassing a filter (360) in said first feedback means for a predetermined time.

* * * * *